US 9,476,334 B2

(12) United States Patent
Tada et al.

(10) Patent No.: US 9,476,334 B2
(45) Date of Patent: Oct. 25, 2016

(54) WORKING VEHICLE

(75) Inventors: Hiroyuki Tada, Sakai (JP); Masato Asahara, Kobe (JP); Yoshihiro Ueda, Sakai (JP); Eiji Sato, Sakai (JP); Akira Minoura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 1031 days.

(21) Appl. No.: 13/046,229

(22) Filed: Mar. 11, 2011

(65) Prior Publication Data

US 2011/0259012 A1    Oct. 27, 2011

(30) Foreign Application Priority Data

Apr. 27, 2010  (JP) ................. 2010-102318

(51) Int. Cl.
| F01N 3/00 | (2006.01) |
| F01N 3/05 | (2006.01) |
| F01P 5/06 | (2006.01) |
| F01P 1/00 | (2006.01) |

(52) U.S. Cl.
CPC ............... F01N 3/055 (2013.01); F01P 5/06 (2013.01); *F01P 2001/005* (2013.01); *F01P 2060/16* (2013.01); *Y02T 10/20* (2013.01)

(58) Field of Classification Search
CPC ......... B60K 13/04; B60K 6/22; F01N 13/08; F01N 2340/04; F01N 13/1822
USPC .................... 180/309, 68.1; 60/317
See application file for complete search history.

(56) References Cited

U.S. PATENT DOCUMENTS

| 3,982,503 | A | * | 9/1976 | Keranen ................ 123/491 |
| 5,228,530 | A | | 7/1993 | Tsuchihashi |
| 5,689,953 | A | * | 11/1997 | Yamashita et al. ........ 60/316 |
| 7,762,064 | B2 | * | 7/2010 | Tennison ................ 60/317 |
| 7,836,967 | B2 | * | 11/2010 | Daniel ............... B60K 11/04 |
| | | | | 172/781 |
| 8,418,448 | B2 | * | 4/2013 | Kamata ............ B60K 5/1208 |
| | | | | 60/299 |

FOREIGN PATENT DOCUMENTS

| GB | 2206472 A | * | 1/1989 | |
| JP | 55-17934 | | 2/1980 | |
| JP | 5-016679 | | 1/1993 | |
| JP | 5-16679 | | 1/1993 | |
| JP | 07-277012 | | 10/1995 | |
| JP | 2003-104071 | | 4/2003 | |
| JP | 2009-35111 | | 2/2009 | |
| JP | WO 2009142058 A1 | * | 11/2009 | ....... B60K 5/1208 |

* cited by examiner

*Primary Examiner* — Thomas Denion
*Assistant Examiner* — Brandon Lee
(74) *Attorney, Agent, or Firm* — Greenblum & Bernstein, P.L.C.

(57) ABSTRACT

A working vehicle has a cooling fan provided on a first side of an engine to blow air to the engine; a muffler main body provided on a second side thereof in a position lower than an upper surface of a head cover of the engine; and an exhaust pipe exposed in a position facing an air blowing path of the cooling fan higher than the upper surface of the head cover of the engine to discharge exhaust from the muffler main body.

20 Claims, 10 Drawing Sheets

WORKING VEHICLE

CROSS-REFERENCE TO RELATED APPLICATIONS

The present application claims priority under 35 U.S.C. §119 of Japanese Application No. 2010-102318, filed on Apr. 27, 2010, which is herein expressly incorporated by reference in its entirety.

BACKGROUND OF THE INVENTION

1. Field of the Invention

The present invention relates to a working vehicle having an engine cooling fan and a muffler.

2. Description of Related Art

A conventional working vehicle having an engine cooling fan and a muffler is known to have a structure as described in (1) or (2) below. (1) A muffler main body and an exhaust pipe are provided in an upper rear portion of an engine immediately before an exhaust grill. A radiator cooling fan provided on the front side of the engine cools the muffler main body and the exhaust pipe (refer to Related Art 1). (2) A muffler main body is provided in an upper portion of an engine on a downstream side in an air blowing direction of a radiator cooling fan. An exhaust pipe extending from the muffler main body is composed of an upstream exhaust pipe portion on the muffler main body side and a downstream exhaust pipe portion that discharges exhaust outside and is fitted externally to the upstream exhaust, pipe portion with a gap for an ejector. Cooling air is forced into the fitted portion of the upstream exhaust pipe portion and the downstream exhaust pipe portion by velocity pressure of an engine cooling fan so as to reduce exhaust temperature (refer to Related Art 2).

[Related Art 1] Japanese Patent Laid-Open Publication No. H5-16679 (paragraph [0007]; FIGS. 1 and 2)

[Related Art 2] Japanese Patent Laid-Open Publication No. H7-277012 (paragraphs [0008] and [0010]; FIGS. 2 and 4)

In the structure disclosed in Related Art 1, the muffler main body is provided at a relatively high position in the upper rear portion of the engine and in the air path of the cooling air from the cooling fan. Furthermore, the exhaust pipe directing exhaust to outside from the muffler main body is also provided in the air path of the cooling air and is directed to the exhaust grill. Thus, the structure is effective to prevent a temperature increase under a hood due to a temperature increase of the muffler and to reduce the exhaust temperature from the muffler. Recently, however, a muffler main body having a catalyst thereinside is employed as a measure for exhaust gas to prevent environmental contamination. In this case, it is necessary to maintain the inside of the muffler main body at a relatively high temperature to effectively exhibit the catalytic function. If the cooling air does not sufficiently blow onto the muffler main body to maintain the temperature inside the muffler main body, the exhaust temperature from the exhaust pipe may be too high.

As disclosed in Related Art 2, the exhaust pipe extending from the muffler main body is elongated, and the cooling air is forced into the gap at the fitted portion of the upstream exhaust pipe portion and the downstream exhaust pipe portion by the velocity pressure of the cooling fan. The cooling air and the long exhaust pipe are thus used to reduce the exhaust temperature. It is difficult, however, to employ the structure in a small working device since there is not sufficient space to accommodate the long exhaust pipe. Furthermore, the muffler main body, which needs to be maintained at a high temperature, is positioned in the air path of the cooling fan in order to position the fitted portion in the air path of the cooling fan. A measure is also required to prevent excessive cooling due to the cooling air directly affecting the muffler main body, thus possibly leading to a further complex structure and an increase in the number of components.

SUMMARY OF THE INVENTION

An advantage of the present invention is to provide a working vehicle capable of maintaining a high temperature in a muffler main body and reducing an exhaust temperature, while preventing a complex structure by appropriately arranging placement of the muffler main body and an exhaust pipe.

In view of the circumstances above, a first aspect of the present invention provides a working vehicle including a cooling fan provided on a side of an engine to blow air to the engine; a muffler main body provided on an opposite side of the engine in a position lower than an upper surface of a head cover of the engine; and an exhaust pipe exposed in a position higher than the upper surface of the head cover of the engine and facing an air blowing path of the cooling fan to discharge exhaust from the muffler main body.

The working vehicle according to the first aspect of the present invention is provided with the muffler main body on the side opposite to the cooling fan that blows air to the engine and at the position lower than the upper surface of the head cover of the engine. The cooling fan thus ensures cooling of the engine. In view of the cooling function affecting the muffler main body provided behind the engine, an amount of cooling air that reaches the muffler main body is reduced since the cooling air is blocked by the engine. Furthermore, the air reaches the muffler main body after the temperature is increased to some extent resulting from a contact with the cooled object, which is the engine positioned on the upstream side. Thus, the cooling function by the cooling air is reduced, and the temperature of the muffler main body can be effectively maintained high to exhibit a catalyst function. In addition, the exhaust pipe to discharge the high temperature exhaust from the muffler main body which is maintained at a high temperature is exposed at the position higher than the upper surface of the head cover of the engine, and is provided facing the air blowing path of the cooling fan. Thus, the cooling air is not blocked by the engine and reaches the exhaust pipe in a sufficient amount with a limited increase in the temperature caused by a direct contact with the engine, and thereby the exhaust temperature from the exhaust pipe can surely be reduced.

The placement relationship of the muffler main body and the exhaust pipe relative to the cooling fan is appropriately arranged in view of the placement relationship with the engine. Thereby, the structure can be simply configured to surely reduce the exhaust temperature on the exhaust pipe side while maintaining a high temperature of the muffler main body.

A second aspect of the present invention provides the working vehicle, in which the exhaust pipe includes an exhaust pipe portion composed of a separate body from the muffler main body; the muffler main body is supported by the engine side, and the exhaust pipe portion is supported by a support frame standing from a vehicle frame; and a connecting portion of the muffler main body and the exhaust pipe portion is configured to allow a relative movement of the muffler main body and the exhaust pipe portion within a predetermined range in the connecting portion.

In the working vehicle according to the second aspect, the exhaust pipe portion composed of a separate body from the muffler main body is used as the exhaust pipe connected to the muffler main body, and the separate exhaust pipe portion is supported by the support frame standing from the vehicle frame, not by the muffler main body. Thus, a situation can be prevented in which, for instance, a long exhaust pipe supported only by a muffler main body is largely swung and damaged as the engine vibrates. The connecting portion of the muffler main body and the exhaust pipe portion is configured so as to allow a relative movement of the muffler main body and the exhaust pipe portion within a predetermined range at the connecting portion. Since the relative movement of the muffler main body and the exhaust pipe portion at the connecting portion is allowed within the predetermined range, the muffler main body being supported by the engine generally rubber mounted for vibration absorption, the exhaust pipe portion being supported by the support frame fixed to the vehicle frame, a damage due to vibration of the muffler main body can be prevented.

A third aspect of the present invention provides the working vehicle, in which an exhaust manifold is provided on a side portion of the engine having an output shaft directed to the cooling fan; an air cleaner is provided on a side portion opposite to the side on which the exhaust manifold is provided; and the air blowing path from the cooling fan is provided on the side portion of the engine on the side on which the exhaust manifold is provided. An end portion of the exhaust pipe extending from the muffler main body is positioned in an upper portion of the air blowing path, and is supported by the support frame standing from the vehicle frame such that an exhaust direction in an exhaust outlet of the end portion is aligned with the air blowing direction in the air blowing path.

The invention also provides for a working vehicle comprising a cooling fan provided on a side of an engine to blow air to the engine, a muffler main body provided on an opposite side of the engine in a position lower than an upper surface of a head cover of the engine, an exhaust pipe having a portion exposed in a position higher than the upper surface of the head cover of the engine and facing an air blowing path of the cooling fan to discharge exhaust from the muffler main body, and a spacing gap arranged within an upstream end of the exhaust pipe. The working vehicle is a mower vehicle and the engine is at least one of oriented along a front and back direction of the mower vehicle and/or arranged at a rear of the mower vehicle.

In embodiments, the exhaust pipe is separately formed from the muffler main body, the muffler main body is supported and arranged on the side of the engine, and an exhaust pipe portion is arranged between the muffler main body and the exhaust pipe and is supported by a support frame extending from a vehicle frame.

In embodiments, an exhaust manifold is provided on a side portion of the engine having an output shaft directed to the cooling fan, an air cleaner is provided on a side portion opposite to the side on which the exhaust manifold is provided, the air blowing path from the cooling fan is provided on the side portion of the engine on the side on which the exhaust manifold is provided, and the exhaust pipe is supported by the support frame standing from the vehicle frame such that an exhaust direction in an exhaust outlet of the exhaust pipe is aligned with the air blowing direction in the air blowing path.

In embodiments, the air cleaner is supported by the support frame supporting the exhaust pipe.

The invention also provides for a working vehicle comprising a cooling fan provided on a side of an engine to blow air to the engine along a front and back direction of a vehicle body and a muffler main body provided on an opposite side of the engine in a position out of an air blowing path of the cooling fan. The muffler main body is oriented along a left and right direction of the vehicle body. An exhaust pipe is provided in a position facing the air blowing path of the cooling fan to discharge exhaust from the muffler main body along the front and back direction. The vehicle is a mower vehicle and the engine is at least one of oriented along the front and back direction of the mower vehicle and/or arranged at a rear of the mower vehicle.

In embodiments, the exhaust pipe is coupled to an exhaust pipe portion that is separately formed from the muffler main body, the muffler main body is supported and arranged on the engine side, and the exhaust pipe is supported by a support frame extending from a vehicle frame, and the muffler main body and the exhaust pipe are arranged so as to allow a relative movement of the muffler main body and the exhaust pipe.

In embodiments, an exhaust manifold is provided on a side portion of the engine having an output shaft directed to the cooling fan, an air cleaner is provided on a side portion opposite to the side on which the exhaust manifold is provided, the air blowing path from the cooling fan is provided on the side portion of the engine on the side on which the exhaust manifold is provided, and the exhaust pipe is supported by the support frame standing from the vehicle frame such that an exhaust direction in an exhaust outlet of the exhaust pipe is aligned with the air blowing direction in the air blowing path.

In embodiments, the air cleaner is supported by the support frame supporting the exhaust pipe.

In embodiments, the exhaust pipe comprises a section of exhaust pipe arranged along the left and right direction.

In embodiments, the exhaust pipe comprises a first section of exhaust pipe, a second section of exhaust pipe having a larger cross-section than the first pipe, and a spacing gap arranged between a downstream end of the first section of exhaust pipe and an upstream end of the second section of exhaust pipe.

In embodiments, the first section of exhaust pipe has an upstream end coupled to the muffler main body.

In embodiments, the second section of exhaust pipe has a downstream end that discharges exhaust gas rearwardly.

In embodiments, the exhaust pipe portion is configured to move relative to the exhaust pipe.

In embodiments, the exhaust pipe has air inlet openings and is configured to move relative to a section of exhaust pipe coupled to the muffler main body.

In embodiments, the exhaust pipe has one end that overlaps a section of exhaust pipe coupled to the muffler main body and the end that overlaps the section of exhaust pipe forms the spacing gap.

In embodiments, the exhaust pipe comprises an L-shaped elbow pipe having cooling air inlet openings and has one end that receives therein one end of a section of exhaust pipe that is an L-shaped elbow pipe and that is coupled to the muffler main body.

The invention also provides for a mower vehicle having a rear engine, wherein the mower vehicle comprises a cooling fan provided on a front side of an engine to blow air to the engine along a front and back direction of the mower vehicle, a muffler main body provided on an opposite side of the engine in a position lower than an upper surface of a head cover of the engine, and a section exhaust pipe exposed in a position higher than the upper surface of the head cover of the engine and facing an air blowing path of the cooling fan. The section of exhaust pipe comprises cool air inlet openings and baffles and discharging exhaust gas received from the muffler main body. A spacing gap is structured and arranged to allow for relative movement between the section of exhaust pipe and the muffler main body.

In embodiments, the spacing gap is arranged between an upstream end of the section of exhaust pipe and a downstream end of a connecting section of exhaust pipe that connects the muffler main body to the section of exhaust pipe.

In embodiments, an upstream end of the section of exhaust pipe is oriented along a left and right direction of a vehicle body and a downstream end of the section of exhaust pipe is oriented along a direction of the air blowing path.

In embodiments, exhaust gas enters into the section of exhaust pipe from a left and right direction and exits the section of exhaust pipe along a direction of the air blowing path.

In the working vehicle according to the third aspect, the air cleaner is positioned on the side portion opposite to the side on which the exhaust manifold is provided, and the air blowing path from the cooling fan is provided on the side portion of the engine on the side of the exhaust manifold. The end portion of the exhaust pipe extending from the muffler main body is positioned in the upper portion of the air blowing path. The amount of air from the cooling fan is thus greater on the air blowing path side, which is not blocked by the air cleaner, than the air cleaner side. Thereby, the end portion of the exhaust pipe positioned on the side of the greater amount of air can be cooled effectively. Furthermore, the end portion of the exhaust pipe is supported by the support frame standing from the vehicle frame such that the exhaust direction in the exhaust outlet is aligned with the air blowing direction in the air blowing path. In addition to heat exchange with the cooling air from the cooling fan that reduces the temperature of the end portion and the exhaust pipe and the exhaust temperature, the exhaust discharged from the exhaust outlet is mixed with the cooling air discharged in the same direction, and is thus further effectively cooled down.

A fourth aspect of the present invention provides the working vehicle, in which the air cleaner is supported by the support frame supporting the exhaust pipe portion.

In the working vehicle according to the fourth aspect, the support frame to support the exhaust pipe portion composed on a separate body from the muffler main body is used to support the air cleaner, thereby simplifying the support structure of the air cleaner.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

An embodiment of the present invention is explained below with reference to the drawings.

Overall Structure of Riding Mower

Figure 1:
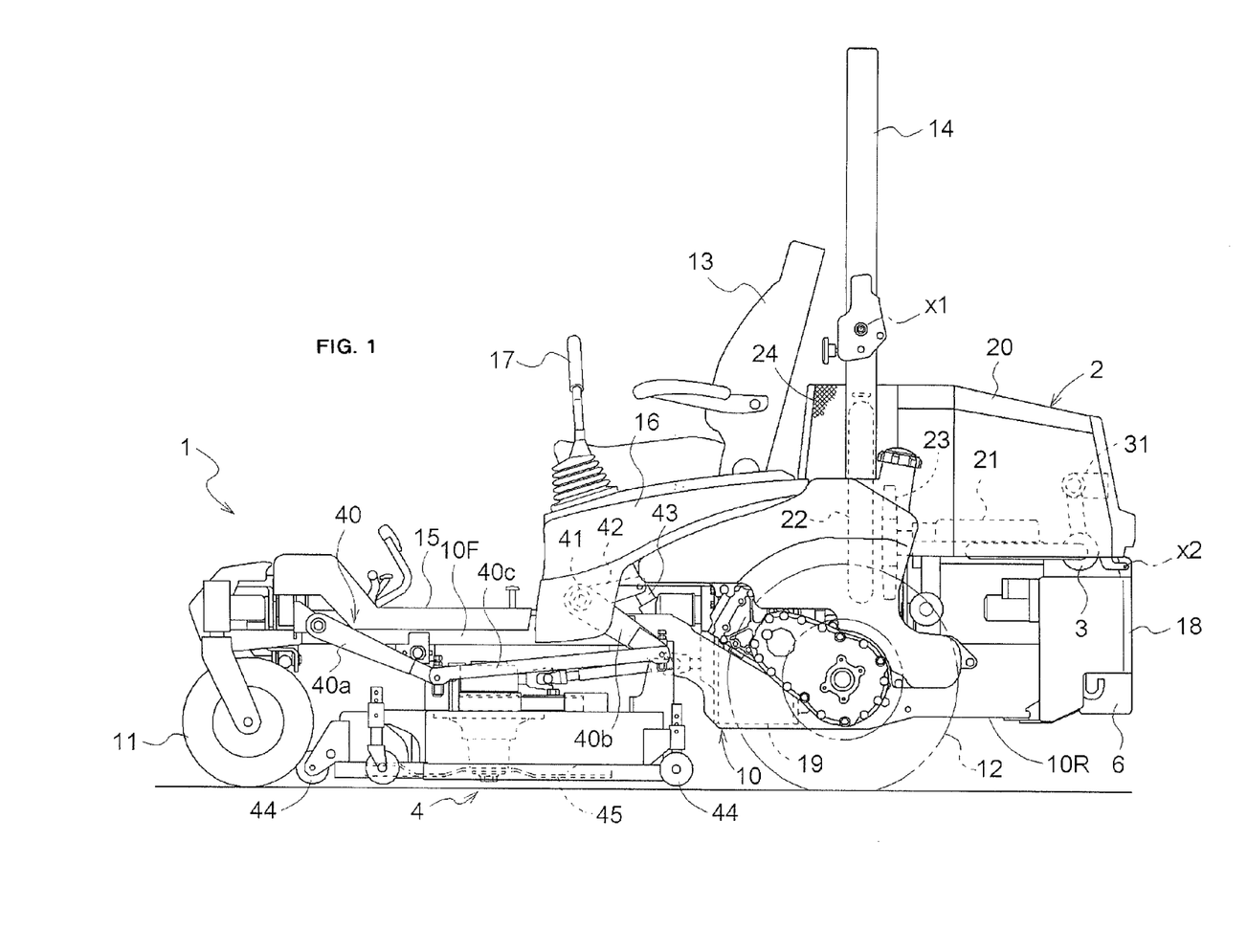
FIG. 1 is an overall side view of a riding mower.
Figure 2:
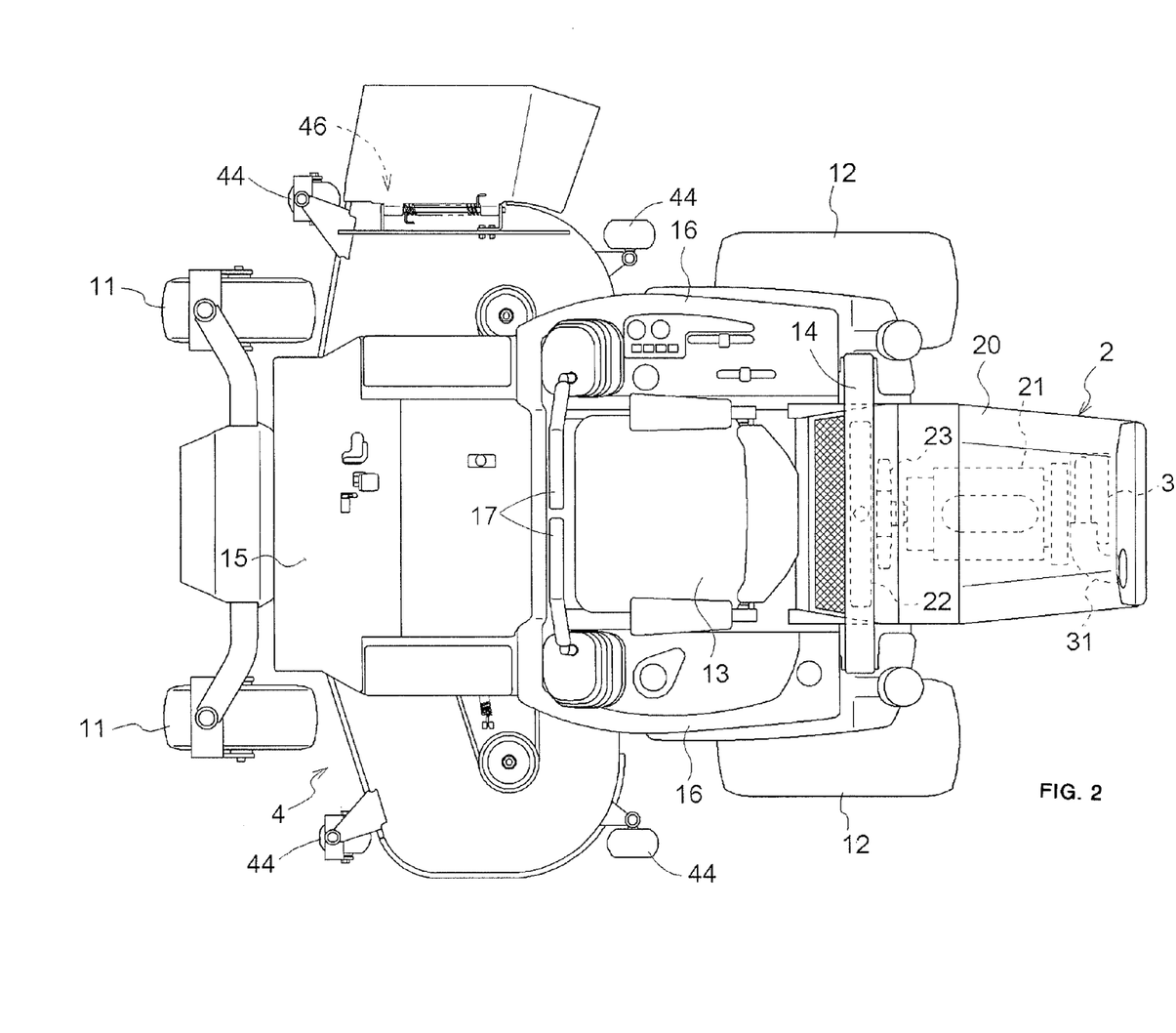
FIG. 2 is an overall plan view of the riding mower.

FIG. 1 is an overall side view of a riding mower as an example of a working vehicle according to the present invention. FIG. 2 is an overall plan view of the riding mower. The commonly-called mid-mount riding mower has a bar blade type mower 4 vertically movably suspended and supported between front wheels 11 and rear wheels 12, each provided as a left and right pair, of a self-propelled vehicle body 1 having a vehicle frame 10 supported by the front and rear wheels. A motor portion 2 housing an engine 21 under a hood 20 is provided in a rear portion of the self-propelled vehicle body 1 on a rear frame portion 1 OR of the vehicle frame 10. A driver's seat 13 is provided in an anteroposteriorly intermediate portion of the self-propelled vehicle body 1.

A gate-shaped rollover protection frame 14 fixedly stands substantially perpendicularly in the rear portion of the driver's seat 13. The rollover protection frame 14 is configured to be foldable rearward in a vertically intermediate portion pivoting at a support x1. With the rollover protection frame 14 folded, grass around a tree trunk can be mowed without the rollover protection frame 14 being caught by extending branches. In a front frame portion 10F of the vehicle frame 10, a step 15 is mounted to a feet position of the driver's seat 13, and fenders 16 are provided on the left and right sides of the driver's seat 13.

The left and right pair of front wheels 11 are caster-type free rotating wheels. The left and right pair of rear wheels 12 are driving wheels independent from each other and capable of variable speed and forward and reverse operation. Driving the left and right rear wheels 12 forward or reverse together at an equal speed runs the vehicle straight forward or backward. Applying differential speeds to the left and right rear wheels 12 steers or turns the vehicle in a desired direction. Specifically, an axial plunger-type hydraulic continuously variable transmission (not shown in the drawing) is provided for the left and right to be powered by the engine 21. Output power from the hydraulic continuously variable transmission for the left and right drives the left and right rear wheels 12. A tilt angle operation section of the hydraulic continuously variable transmission and gear shifting levers 17 are linked, the gear shifting levers 17 being anteroposteriorly swingably provided on the left and right of the driver's seat 13. Thus, when the gear shift levers 17 are held at a neutral position in the anteroposterior direction within an operation area thereof, the hydraulic continuously variable transmission is put into a neutral stop state. Shifting the gear shifting levers 17 forward from the neutral position enables forward gear operation, and shifting backward enables backward gear operation.

The mower 4 is suspended and held to the vehicle frame 10 by a link mechanism 40 in which an intermediate link 40c connects a left and right pair of front swing links 40a and a left and right pair of rear swing links 40b. A swing arm 42 is connected to the link mechanism 40, the swing arm 42 being integrally provided to a support shaft 41 that swingably supports the rear swing links 40b. The swing arm 42 is configured to swing in association with expansion and contraction of a hydraulic cylinder 43 provided to a space with the vehicle frame 10. The link mechanism 40 is thus operated to move up and down the mower 4, which is switched between a down state of working and an up state of non-working. In the down state of working, a gauge wheel 44 is touched on the ground or substantially touched thereon. In the up state of non-working, the gauge wheel 44 is detached from the ground to be stowed in a lower portion of the vehicle frame 10. The mower 4 is a side-discharge type that discharges grass cut by the bar blade 45 from a discharge outlet 46 positioned on a right side of the self-propelled vehicle body 1, as shown in FIG. 2.

Configuration of Motor Portion

Figure 3:
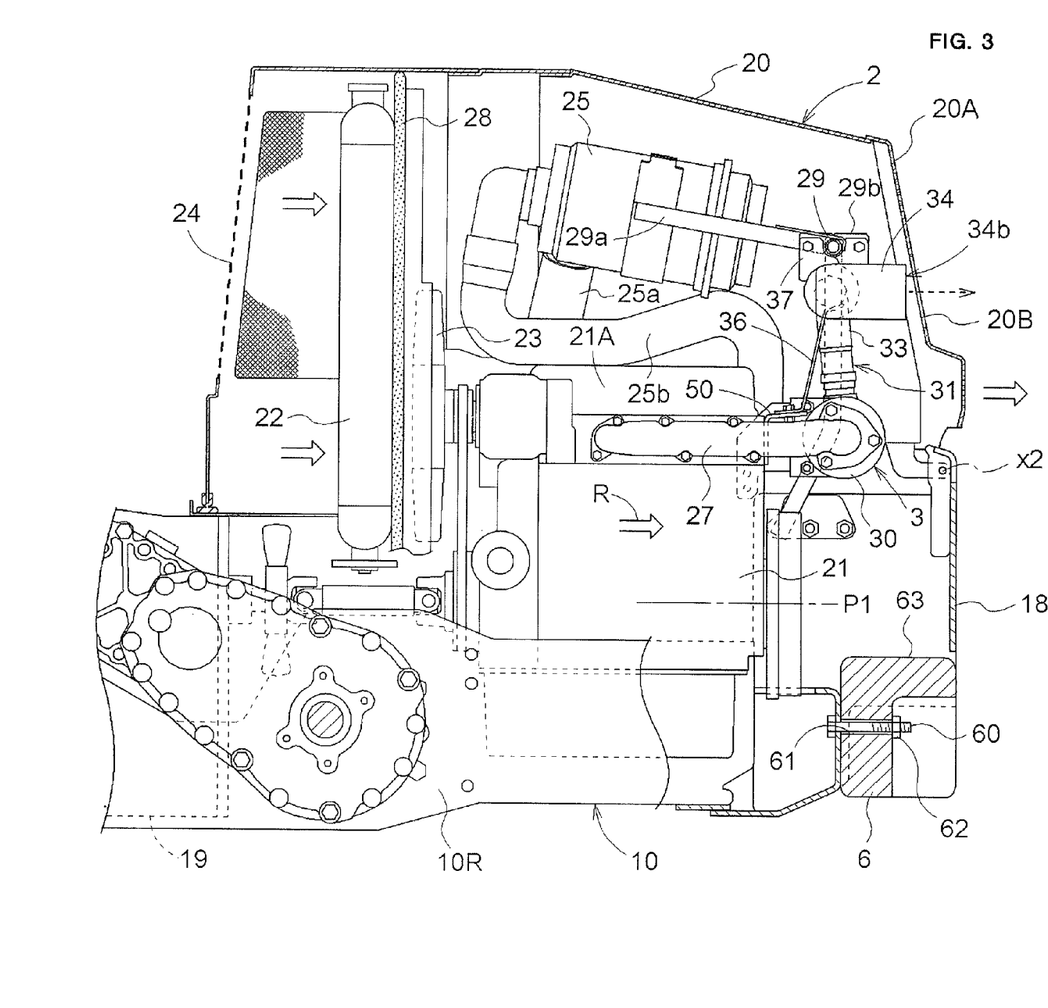
FIG. 3 is a left side view of a motor portion.
Figure 4:
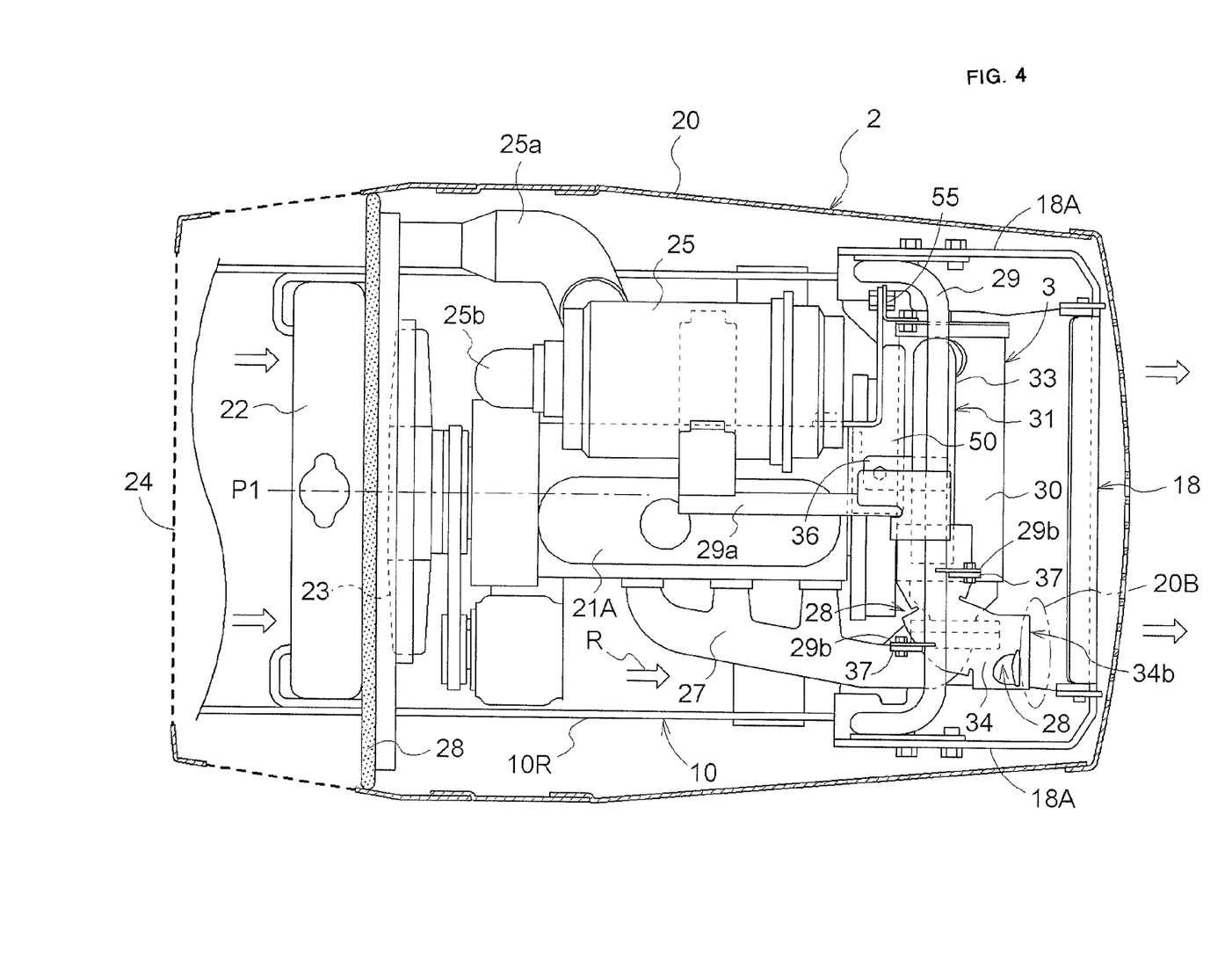
FIG. 4 is a plan view of the motor portion.
Figure 5:
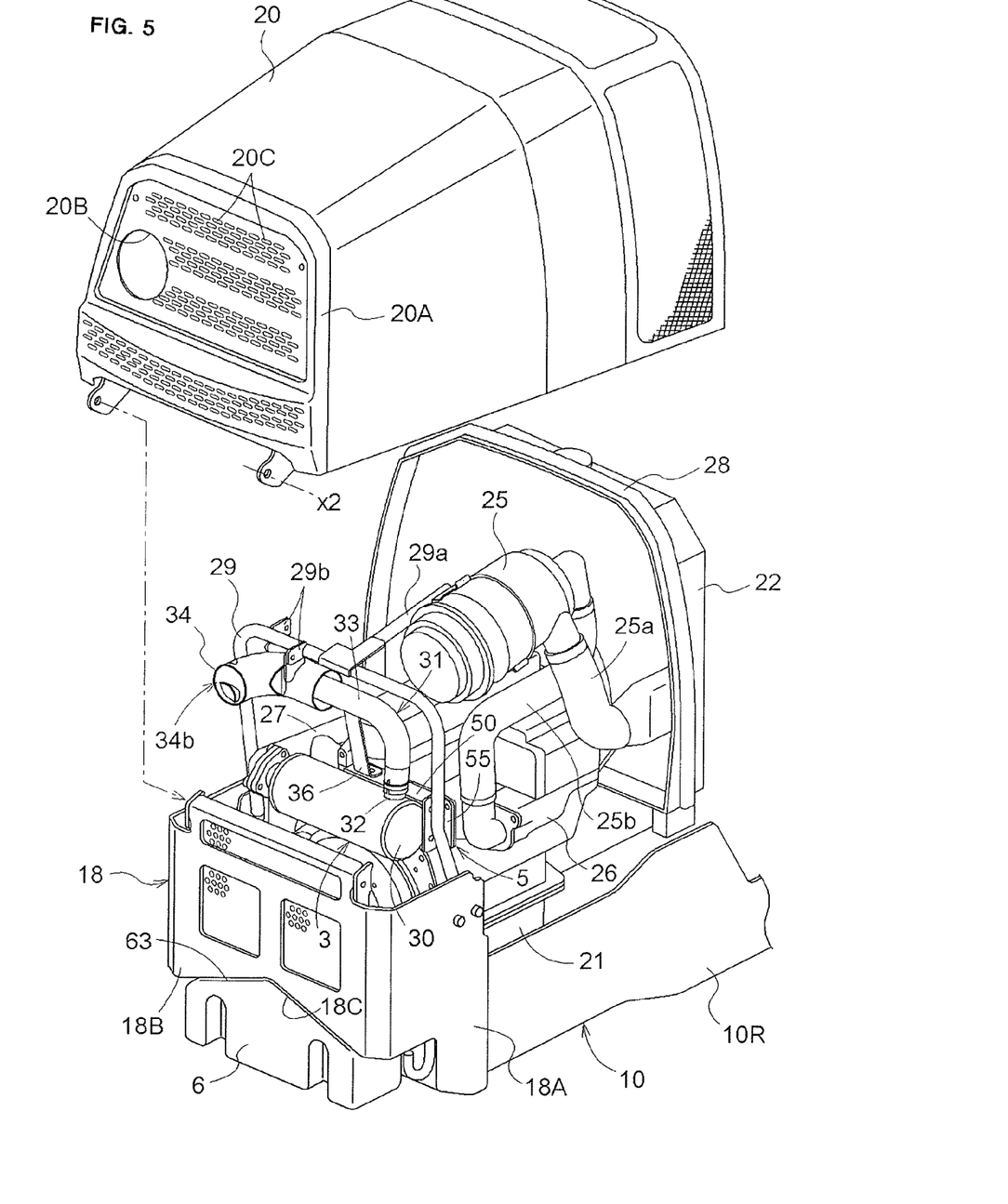
FIG. 5 is a perspective view of the motor portion in a state in which a hood is removed.

As shown in FIGS. 3 to 5, the motor portion 2 has the engine 21, which is a water-cooled type gasoline engine, provided with a radiator 22 on the front side under the hood 20. The engine 21 has an output shaft (not shown in the drawing) having a shaft center P1 provided longitudinally in the anteroposterior direction. The hood 20 covering the engine 21 and the radiator 22 on the front thereof is swingably provided to open and close pivoting at a lateral support x2 in an upper end portion of a rear frame 18 standing from the rear frame portion 10R. The front end side of the hood 20 is supported by a front frame 28 standing so as to fix the lower portion on two sides of the vehicle frame 10 and support the upper portion of the radiator 22.

The back portion of the radiator 22 is provided with a cooling fan 23 rotated and driven by the power from the output shaft of the engine 21. The cooling fan 23 supplies to the radiator 22, external air taken into through a dustproof net 24 for dust removal provided on the front side of the radiator 22.

The engine 21 is rubber mounted to the rear frame portion 10R through an anti-vibration rubber (not shown in the drawing). Thus, vibration from the engine 21 is prevented from directly traveling to the vehicle frame 10. The engine 21 is provided on the front side thereof with a transmission case 19 on the front and the output shaft (not shown in the drawing) transferring a driving force to the cooling fan 23. The power is output from the transmission case 19 to the mower 4 and the hydraulic continuously variable transmission for the left and right rear wheels 12.

As shown in FIGS. 3 to 5, an air cleaner 25 is provided in the right side portion of the engine 21 to suck in external air passing through the dustproof net 24 from the engine front side. Furthermore, an inlet manifold 26 is provided to supply the air purified by the air cleaner 25 to the engine 21.

An exhaust manifold 27 is connected to the left side portion of the engine 21. A muffler 3 is flange-connected to the rear end side of the exhaust manifold 27 so as to wrap around the rear side of the engine 21.

As described above, of the left and right side portions of the engine 21 under the hood 20, the air cleaner 25, which is relatively a large component, and a plurality of engine peripheral devices are provided in the right side portion, including an air intake hose 25a to the air cleaner 25 and a connecting hose 25b to the inlet manifold 26. In contrast, although the exhaust manifold 27 is provided in the left side portion, there is hardly any large engine peripheral device other than the exhaust manifold 27 since the muffler 3 connected to the exhaust manifold 27 is disposed wrapping around the rear side of the engine 21. Thereby, an air blowing path R is provided to facilitate air from the cooling fan 23 to blow in the left side portion of the engine 21 from the radiator 22 side.

The rear frame 18 standing from the rear frame portion 10R of the vehicle frame 10 is connected and fixed to the rear end side of the rear frame portion 10R on the left and right, and thereby also functions as the vehicle frame 10. A gate-shaped support frame 29 stands having lower end portions on two sides fixed to a side panel portion 18A of the rear frame 18. The gate-shaped support frame 29, which is fixed to the side panel portion 18A of the rear frame 18 so as to stand from the vehicle frame 10, is provided with a forward-facing arm 29a projecting forward from the support frame 29. The air cleaner 25 is supported and suspended by the forward-facing arm 29a, obliquely rearward downward viewed from a side.

Configuration of Muffler

The muffler 3 has a muffler main body 30 connected to the exhaust side of the exhaust manifold 27 and an exhaust pipe 31 connected to the muffler main body 30, as shown in FIGS. 3 to 5. The muffler main body 30, which has an original function to mute noise, is integrally provided with a catalyst thereinside to process the exhaust. The muffler main body 30 is provided so as to wrap around the rear side of the engine 21 in a position lower than an upper surface of a head cover 21A for the engine 21, and thus the longitudinal direction is provided along the left and right direction.

The exhaust pipe 31 is composed of an upstream exhaust pipe portion 33 and a downstream exhaust pipe portion 34 (corresponding to an exhaust pipe portion), the upstream exhaust pipe portion 33 being connected to an exhaust outlet 32 provided in the downstream (right end side in FIGS. 6 and 7) upper portion in the exhaust direction of the muffler main body 30, the downstream exhaust pipe portion 34 being connected to the upstream exhaust pipe portion 33.

As shown in FIGS. 4 to 8, the upstream exhaust pipe portion 33 is composed of an elbow pipe bent in an L shape viewed from a rear surface. A slit 33a is formed in a vertical fitted portion of an upstream end portion thereof which is externally fitted to the exhaust outlet 32 provided in the upper portion of the muffler main body 30. The slit 33a provided in the fitted portion of the upstream end portion of the upstream exhaust pipe portion 33 is slightly expanded as the fitted portion of the upstream end portion of the upstream exhaust pipe portion 33 is externally fitted to the exhaust outlet 32 of the muffler main body 30. Thereby, the fitted portion can be elastically fitted to the exhaust outlet 32 and mounted thereto while the vertical position is being adjusted. After being externally fitted to the exhaust outlet 32 and the fitting position is determined, the fitted portion is fastened and connected by a metal fastening band 35.

Figure 8:
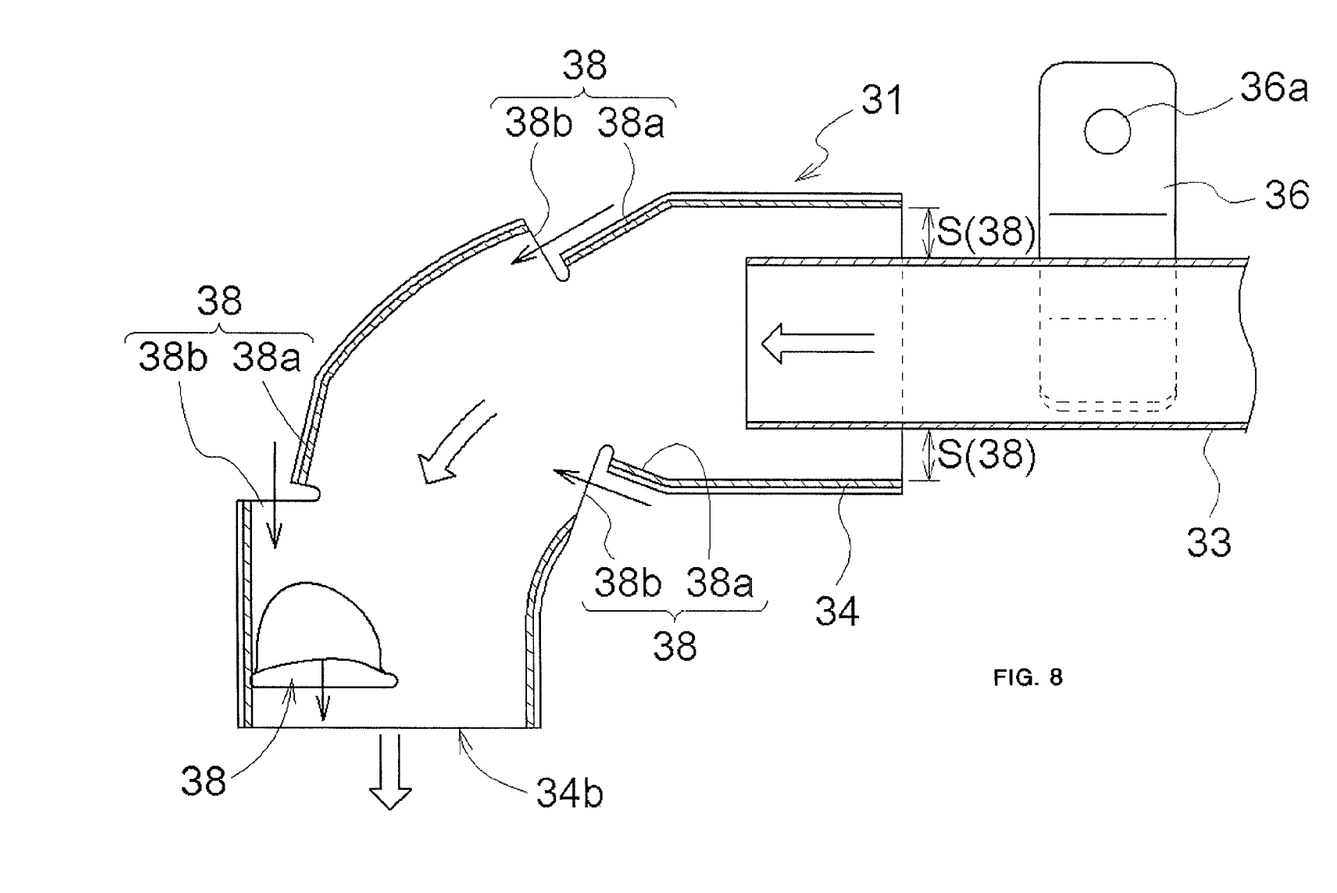
FIG. 8 is a cross-sectional view of an exhaust pipe portion.

An upper end side of a support stay 36 is welded and connected to a lateral pipe portion in the upper portion of the upstream exhaust pipe portion 33. A bolt hole 36a is formed on the lower end side of the support stay 36. Thus, the lower end side of the support stay 36 is bolt connected to a second member 52 of a mounting fitting 5 (hereinafter described) fixed to the engine 21.

The downstream exhaust pipe portion 34 has a diameter greater than the downstream end portion of the upstream exhaust pipe portion 33, as shown in FIGS. 4 to 8. The downstream exhaust pipe portion 34 is composed of an elbow pipe bent in an L shape and has an upstream end portion thereof externally fitted to the downstream end portion of the upstream exhaust pipe portion 33. A downstream end portion, which is the end portion of the downstream exhaust pipe portion 34, is directed to an exhaust hole 20B formed in a rear end surface 20A of the hood 20. Thus, the exhaust is discharged to outside of the hood 20.

The downstream exhaust pipe portion 34 is bolt connected through a mounting fitting 37 welded and fixed to the external periphery thereof to a mounting bracket 29b fixed to the support frame 29 standing from the vehicle frame 10. Thus, a spacing gap S is formed in the fitted portion of the downstream exhaust pipe portion 34 and the upstream exhaust pipe portion 33, the gap S being equivalent to a difference in diameters thereof. The gap S is provided so as to have a distance sufficient to avoid a contact of the downstream exhaust pipe portion 34 and the upstream exhaust pipe portion 33, even if a relative movement occurs in the pipe diameter direction in the fitted portion due to vibration of the engine 21.

Furthermore, the downstream exhaust pipe portion 34 has a plurality of cooling air intake portions 38 in the circumferential and pipe length directions. The cooling air intake portions 38 are each composed of an exhaust guiding wall 38a and an opening 38b, the exhaust guiding wall 38a being formed by partially cutting the downstream exhaust pipe portion 34 in the circumferential direction and concaving inward a pipe peripheral wall closer to an upstream side in an exhaust flow direction than the cut portion, the opening 38b being concurrently formed between the downstream end portion of the exhaust guiding wall 38a and the arcuate peripheral wall of the downstream exhaust pipe portion 34. Specifically, the configuration allows the air blowing from the cooling fan 23 to enter easily through the plurality of cooling air intake portions 38 relative to exhaust gas flowing into the downstream exhaust pipe portion 34. In addition, the gap S provided between the downstream exhaust pipe portion 34 and the upstream exhaust pipe portion 33 also functions as the cooling air intake portion 38.

The downstream exhaust pipe portion 34 and the lateral pipe portion in the upper portion of the upstream exhaust pipe portion 33 are mounted to the support frame 29 and the second member 52 of the mounting fitting 5 (hereinafter described) on the engine 21, respectively, so as to be provided above the upper surface of the heard cover 21A for the engine 21. Furthermore, the cooling air intake portions 38 of the downstream exhaust pipe portion 34 are provided so as to face the air blowing path R of the cooling fan 23. The end portion of the downstream exhaust pipe portion 34 is disposed so as to face the air blowing path R of the cooling fan 23. Since the end portion is directed to the exhaust hole 20B provided in the rear end surface 20A of the hood 20, the end portion is supported by the support frame 29 such that the exhaust direction in the exhaust outlet 34b of the end portion is aligned with the air blowing direction in the air blowing path R, as shown in FIG. 4.

A plurality of ventilation holes 20C are provided entirely in the rear end surface 20A of the hood 20 to which the exhaust hole 20B is provided, including an area surrounding the exhaust hole 20B, such that the heat under the hood 20 can be exhausted smoothly.

FIGS. 9(a) to 10(b) illustrate the mounting fitting 5 provided to the mount portion of the engine 21 and the muffler 3. The mounting fitting 5 is composed of a combination of a sheet-metal first mounting fitting 50 and a sheet-metal second mounting fitting 55, the first mounting fitting 50 being bolt connected to the engine 21, the second mounting fitting 55 being connected to the first mounting fitting 50 to support the muffler main body 30.

Figure 9A:
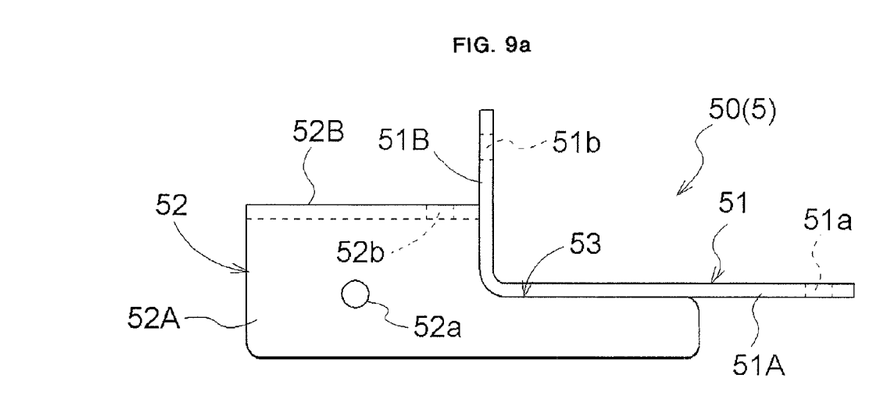
FIGS. 9(a) to 9(c) are a plan view, a rear view, and a left side view, respectively, of a mounting fitting of a muffler main body.
Figure 9B:
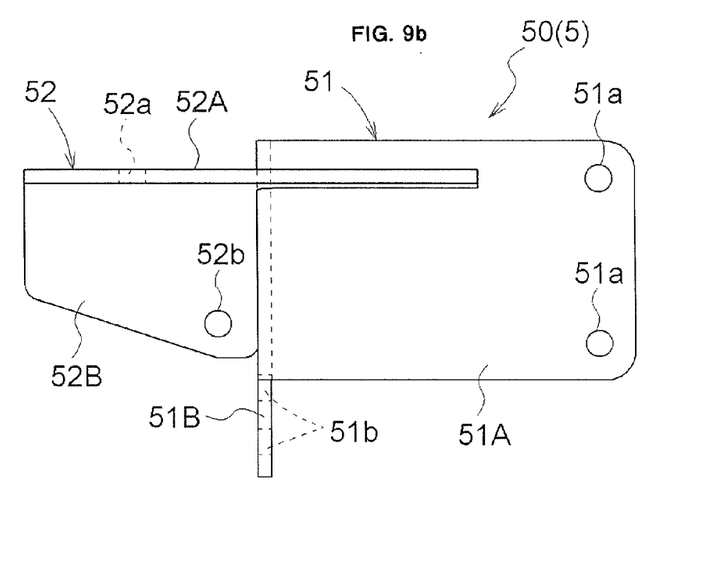
Figure 9C:
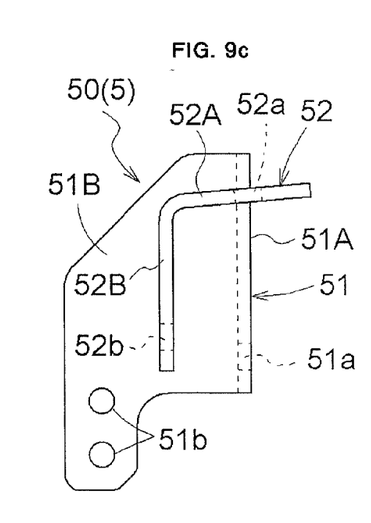

As shown in FIGS. 9(a) to 9(c), the first mounting fitting 50 has a first member 51 bent in an L shape and a second member 52 bent in an L shape and having a cutoff 53 to which the L-shaped bent portion of the first member 51 is inserted. The L-shaped bent portion of the first member 51 is inserted and welded to the cutoff 53 of the second member 52, and thereby the first mounting fitting 50 is integrally provided.

A pair of bolt holes 51a for connection with the second mounting fitting 55 are provided vertically in an end portion on a side opposite to the bent portion of the rearward-facing surface 51A of the first member 51 of the first mounting fitting 50. Furthermore, a pair of laterally-facing mounting holes 51b for bolt connection with the engine 21 in the left and right direction are provided vertically on a laterally-facing surface 51B which is bent orthogonal to the rearward-facing surface 51A of the first member 51.

A bolt hole 52a for attaching and fixing the lower portion of the support stay 36 is provided in an upward surface 52A of the second member 52 of the first mounting fitting 50 so as to support the upstream exhaust pipe portion 33. An anteroposterior mounting hole 52b for bolt connection with the engine 21 from the rear side is provided in a forward-facing surface 52B bent in an intersecting direction to the upward surface 52A.

Figure 10A:
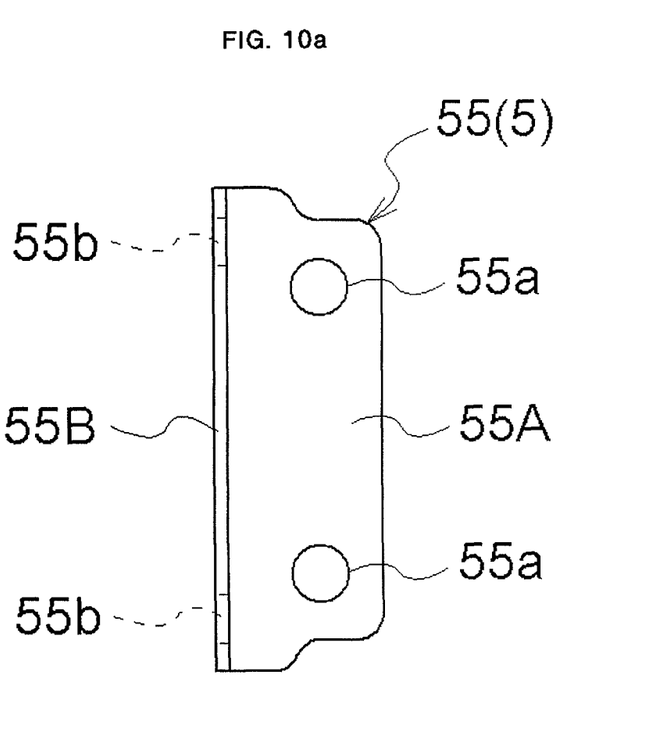
FIGS. 10(a) and 10(b) are a rear view and a right side view, respectively, of the mounting fitting of the muffler main body.
Figure 10B:
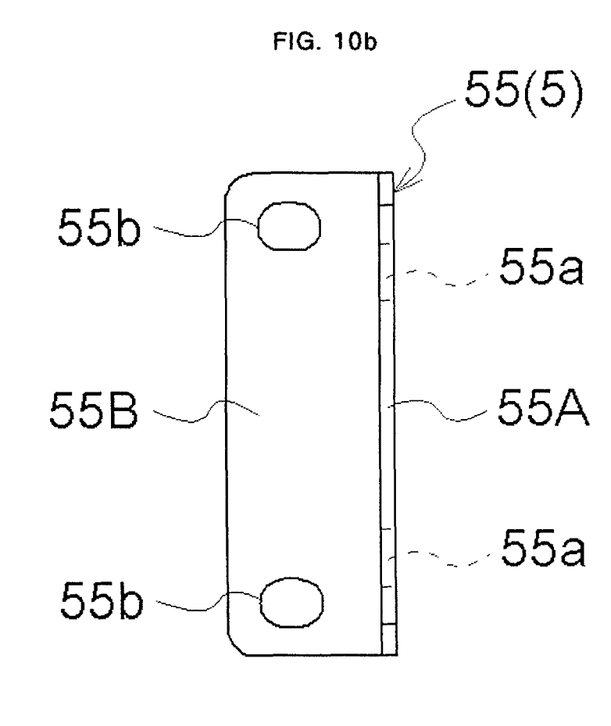

As shown in FIGS. 10(a) and 10(b), the second mounting fitting 55 is composed of a plate material having a cross section bent in an L shape. A pair of round mounting holes 55a are provided vertically in a forward-facing mounting surface 55A on a side connected to the first member 51. A pair of mounting holes 55b having a horizontally long shape in the anteroposterior direction are provided vertically in a laterally-facing mounting surface 55B connected to the muffler main body 30. Providing the mounting holes 55b having a horizontally long shape in the anteroposterior direction in the laterally-facing mounting surface 55B connected to the muffler main body 30 allows the mounting position of the muffler main body 30 to the engine 21 to be adjusted in the anteroposterior direction and prevents the muffler main body 30 from being mounted while internal stress is generated in the anteroposterior direction.

The connecting portion of the muffler main body 30 and the exhaust pipe 31 is fitted vertically so as to allow the position to be adjusted, as described above. The muffler main body 30 is thus prevented from being connected with internal stress remaining in the vertical direction as well. In addition to the configuration to prevent mounting with internal stress generated in the anteroposterior direction, as described above, the muffler 3 is configured to facilitate mounting in the state in which internal stress is hardly generated in the mounting stage to the engine 21. The connecting portion of the muffler main body 30 and the second mounting fitting 55 in the left and right direction is in the same direction as the bolt connecting direction.

Adjustment can thus be made by changing the number of spacers and washers as required.

Balance Weight

Figure 6:
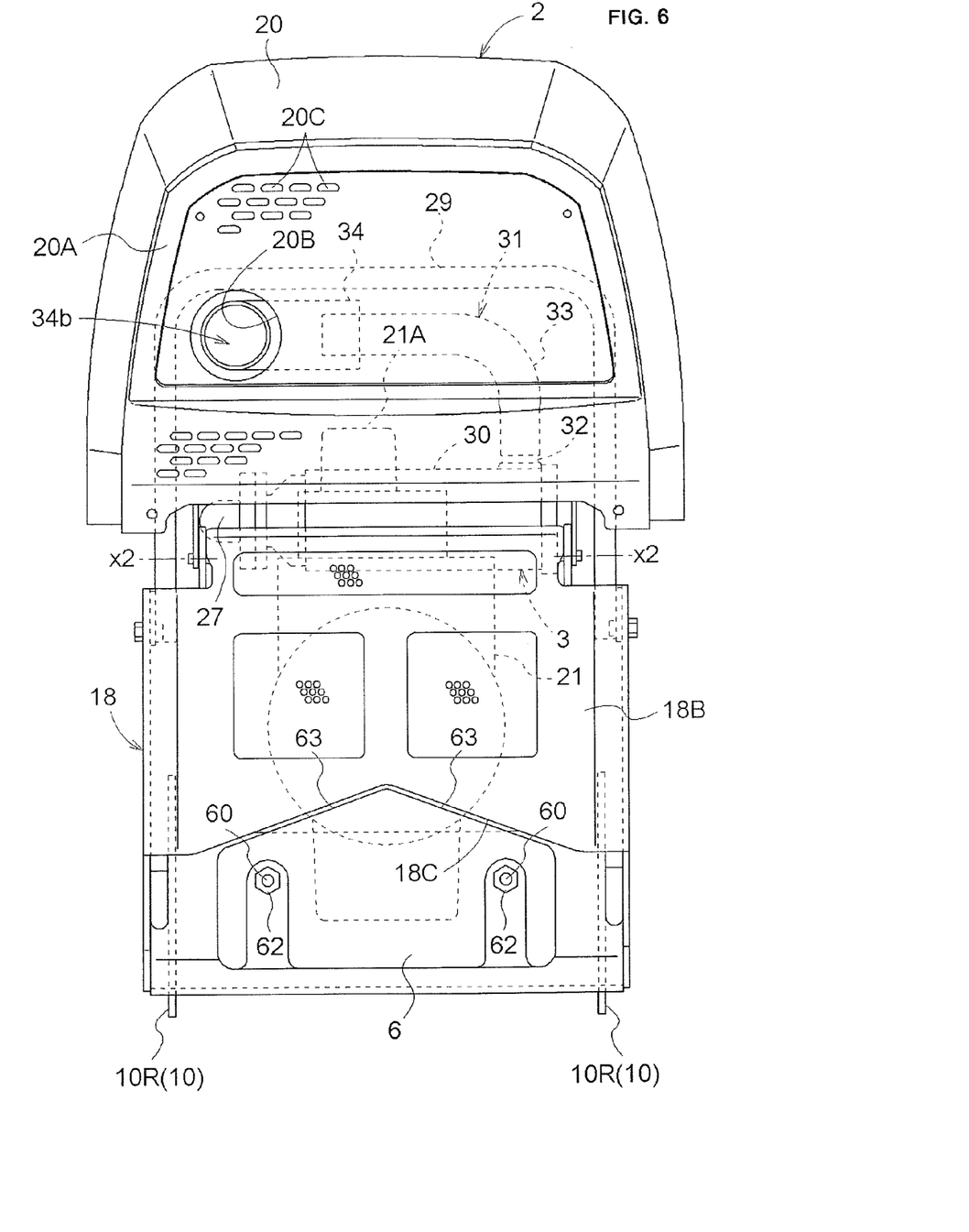
FIG. 6 is a rear view of the motor portion.
Figure 7:
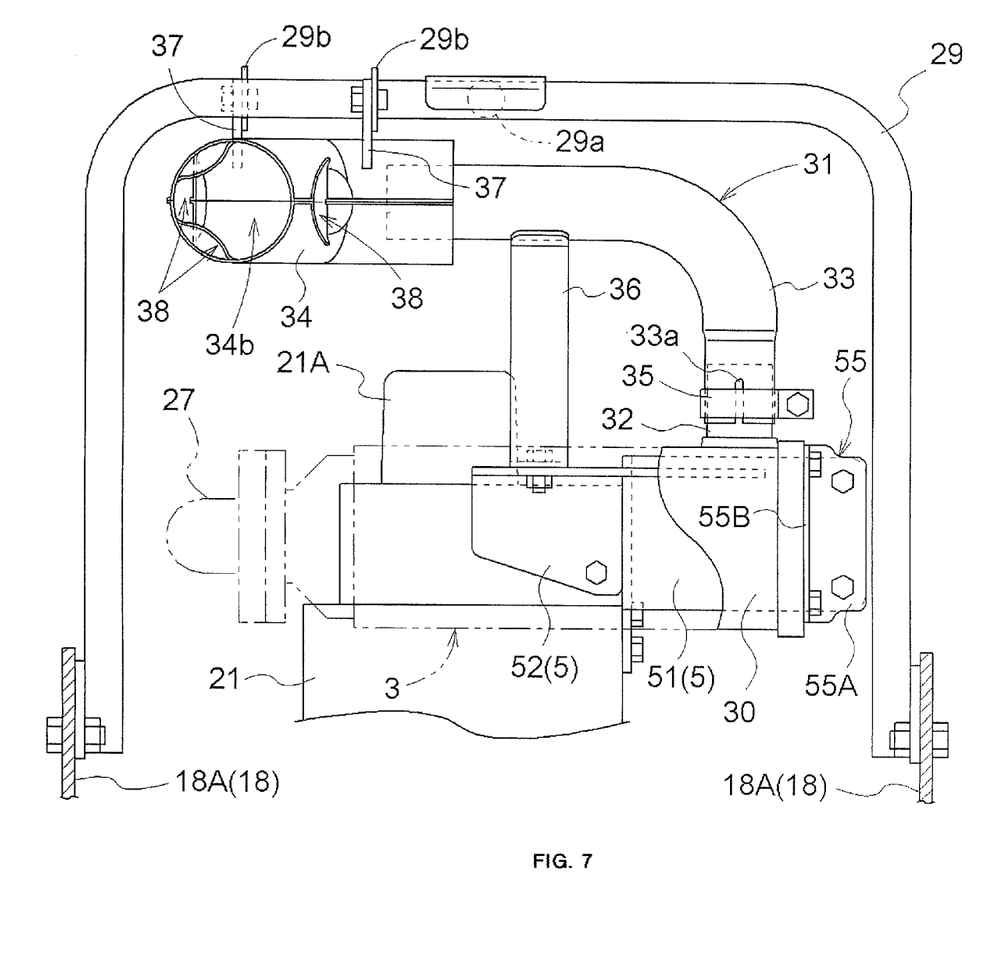
FIG. 7 is a rear view illustrating a state in which a muffler is mounted.

As shown in FIGS. 3, 5, and 6, a balance weight 6 is mounted to a rear end portion of the self-propelled vehicle body 1. An anteroposterior mounting hole 61 is inserted to a stud bolt 60 projecting rearward from the rear portion of the vehicle frame 10, and a nut 62 is fastened and fixed from the rear side. Thereby, the balance weight 6 is mounted to the self-propelled vehicle body 1. The balance weight 6 is formed into a mountain shape having a high middle portion on an upper surface side. An inclined surface 63 is provided to prevent cut grass from being piled up on the upper surface of the balance weight 6 and to allow the grass to fall down to the left and right sides, the cut grass entering under the hood 20 and falling down from a lower side opening of the rear frame 18. In a lower end edge of the rear surface 18B of the rear frame 18, an inverse V-shaped cutoff portion 18C is provided along the mountain shape on the upper surface side of the balance weight 6. Thus, when the mounting hole 61 of the balance weight 6 is inserted to the stud bolt 60, the cutoff portion 18C is aligned with the mountain shape on the upper surface side of the balance weight 6, thereby also functioning as a guiding member that easily guides the center of the mounting hole 61 to the position of the stud bolt 60.

Alternative First Embodiment

The type of the engine 21 is not limited to a water-cooling type as described in the embodiment above, but may be an air-cooling type or a diesel engine.

Alternative Second Embodiment

The direction of the output shaft of the engine 21 is not limited to be longitudinal in the anteroposterior direction, but may be lateral in a lateral rear direction. Alternatively, the engine 21 may be placed on the front side of the vehicle. In the structure in which the engine 21 is placed on the front side of the vehicle body and cooling air is blown from the rear side, the muffler main body 30 may be placed on the front side of the engine 21. In other words, any placement structure is acceptable as long as the flow direction of cooling air and the placement relationship of the muffler main body 30 and the exhaust pipe 31 are set according to the concept of the present invention. In the above embodiment, when the inlet manifold 26 is provided on the right side of the engine 21 and the exhaust manifold 27 is provided on the left side, the upstream side of the exhaust pipe 31 is provided on the right side and the downstream side is on the left side. The structure is not limited as above, and a structure may be employed in which the left and right sides are reversed. Specifically, in the structure in which the inlet manifold 26 is provided on the left side of the engine 21 and the exhaust manifold 27 is provided on the right side, the upstream side of the exhaust pipe 31 may be provided on the left side; and the downstream side be on the right side.

Alternative Third Embodiment

The second mounting fitting 55 of the mounting fitting 5 is not limited to the vertical pair of circular mounting holes 55a provided in the forward-facing mounting surface 55A on the side connected to the first member 51, as described in the embodiment above. The mounting holes 55a provided in the forward-facing mounting surface 55A may be formed into a horizontally long shape similar to the mounting holes 55b provided in the laterally-facing mounting surface 55B, such that the position can be adjusted in the connecting portion of the first mounting fitting 50 and the second mounting fitting 55 in the left and right direction.

The working vehicle of the present invention is applicable not only to riding mowers, as illustrated in the embodiments, but may be to a variety of working vehicles, including, for example, tractors, combines, moving farm machines, such as rice transplanters, construction machines, and delivery vehicles.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A working vehicle comprising:
a vehicle frame;
a mower unit coupled to the vehicle frame;
an engine having a head cover;
a cooling fan provided on a side of the engine to blow air to the engine;
a muffler main body provided on an opposite side of the engine in a position lower than an upper surface of the head cover of the engine;
an exhaust pipe having a portion exposed in a position higher than the upper surface of the head cover of the engine and facing an air blowing path of the cooling fan to discharge exhaust from the muffler main body;
a spacing gap arranged within an upstream end of the exhaust pipe; and
said spacing gap being located at a position higher than:
the muffler main body; and
the upper surface of the head cover of the engine,
wherein the working vehicle is a mower vehicle and the engine is at least one of oriented along a front and back direction of the mower vehicle and/or arranged at a rear of the mower vehicle.

2. The working vehicle according to claim 1, wherein the exhaust pipe is separately formed from the muffler main body;
the muffler main body is supported and arranged on the side of the engine, and
an exhaust pipe portion is arranged between the muffler main body and the exhaust pipe and is supported by a support frame extending from the vehicle frame.

3. The working vehicle according to claim 2, wherein an exhaust manifold is provided on a side portion of the engine;

an air cleaner is provided on a side portion opposite to the side on which the exhaust manifold is provided;

the air blowing path from the cooling fan is provided on the side portion of the engine on the side on which the exhaust manifold is provided; and the exhaust pipe is supported by the support frame standing from the vehicle frame such that an exhaust direction in an exhaust outlet of the exhaust pipe is aligned with the air blowing direction in the air blowing path.

4. The working vehicle according to claim 3, wherein the air cleaner is supported by the support frame supporting the exhaust pipe.

5. A riding mower working vehicle having a mowing unit, a vehicle body and an engine with a head cover, comprising:

a cooling fan provided on a side of the engine to blow air to the engine along a front and back direction of the vehicle body;

a muffler main body provided on an opposite side of the engine in a position out of an air blowing path of the cooling fan;

the muffler main body being oriented along a left and right direction of the vehicle body;

an exhaust pipe provided in a position facing the air blowing path of the cooling fan to discharge exhaust from the muffler main body along the front and back direction;

a spacing gap arranged between a downstream end of a first section of exhaust pipe and an upstream end of a second section of exhaust pipe; and the spacing gap being located at a position higher than: the muffler main body; and an upper surface of the head cover of the engine, wherein the engine is at least one of oriented along the front and back direction of the vehicle body and/or arranged at a rear of the vehicle body.

6. The working vehicle according to claim 5, wherein the exhaust pipe is coupled to an exhaust pipe portion that is separately formed from the muffler main body;

the muffler main body is supported and arranged on the engine side, and the exhaust pipe is supported by a support frame extending from a vehicle frame of the vehicle body; and the muffler main body and the exhaust pipe are arranged so as to allow a relative movement of the muffler main body and the exhaust pipe.

7. The working vehicle according to claim 6, wherein an exhaust manifold is provided on a side portion of the engine;

an air cleaner is provided on a side portion opposite to the side on which the exhaust manifold is provided;

the air blowing path from the cooling fan is provided on the side portion of the engine on the side on which the exhaust manifold is provided; and the exhaust pipe is supported by the support frame standing from the vehicle frame such that an exhaust direction in an exhaust outlet of the exhaust pipe is aligned with the air blowing direction in the air blowing path.

8. The working vehicle according to claim 7, wherein the air cleaner is supported by the support frame supporting the exhaust pipe.

9. The working vehicle according to claim 5, wherein the exhaust pipe comprises a section of exhaust pipe arranged along the left and right direction.

10. The working vehicle according to claim 5, wherein the exhaust pipe comprises:

the second section of exhaust pipe having a larger cross-section than the first section of exhaust pipe.

11. The working vehicle according to claim 10, wherein the first section of exhaust pipe has an upstream end coupled to the muffler main body.

12. The working vehicle according to claim 10, wherein the second section of exhaust pipe has a downstream end that discharges exhaust gas rearwardly.

13. The working vehicle according to claim 2, wherein the exhaust pipe portion is configured to move relative to the exhaust pipe.

14. The working vehicle according to claim 1, wherein the exhaust pipe has air inlet openings and is configured to move relative to a section of exhaust pipe coupled to the muffler main body.

15. The working vehicle according to claim 1, wherein the exhaust pipe has one end that overlaps a section of exhaust pipe coupled to the muffler main body and the end that overlaps the section of exhaust pipe forms the spacing gap.

16. The working vehicle according to claim 1, wherein the exhaust pipe comprises an L-shaped elbow pipe having cooling air inlet openings and has one end that receives therein one end of a section of exhaust pipe that is an L-shaped elbow pipe and that is coupled to the muffler main body.

17. A mower vehicle comprising:

a vehicle body;

an engine arranged on a rear side of the vehicle body;

the engine having a head cover;

a mowing unit coupled to the vehicle body;

a cooling fan provided on a front side of the engine to blow air to the engine along a front and back direction of the mower vehicle;

a muffler main body provided on an opposite side of the engine in a position lower than an upper surface of the head cover of the engine;

a section exhaust pipe exposed in a position higher than the upper surface of the head cover of the engine and facing an air blowing path of the cooling fan;

the section of exhaust pipe comprising cool air inlet openings and baffles and discharging exhaust gas received from the muffler main body;

a spacing gap structured and arranged to allow for relative movement between the section of exhaust pipe and the muffler main body; and the spacing gap being located at a position higher than: the muffler main body; and the upper surface of the head cover of the engine.

18. The mower vehicle according to claim 17, wherein the spacing gap is arranged between an upstream end of the section of exhaust pipe and a downstream end of a connecting section of exhaust pipe that connects the muffler main body to the section of exhaust pipe.

19. The mower vehicle according to claim 17, wherein an upstream end of the section of exhaust pipe is oriented along a left and right direction of the vehicle body and a downstream end of the section of exhaust pipe is oriented along a direction of the air blowing path.

20. The mower vehicle according to claim 17, wherein exhaust gas enters into the section of exhaust pipe from a left and right direction of the vehicle body and exits the section of exhaust pipe along a direction of the air blowing path.

* * * * *